(12) United States Patent
Enomoto (10) Patent No.: US 6,560,374 B1
(45) Date of Patent: May 6, 2003

(54) IMAGE PROCESSING APPARATUS (75) Inventor: Jun Enomoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/330,091

(22) Filed: Jun. 11, 1999

(30) Foreign Application Priority Data

Jun. 11, 1998 (JP) ............................................. 10-163817

(51) Int. Cl.⁷ .................................................. G06K 9/36
(52) U.S. Cl. ...................................... 382/284; 382/263
(58) Field of Search ................................. 382/284, 264, 382/263, 262, 255, 254, 162, 163, 167, 258, 274, 270, 115; 359/707; 355/32, 41; 358/302; 345/660, 670, 593

(56) References Cited

U.S. PATENT DOCUMENTS

| | | | | |
|---|---|---|---|---|
| 4,480,896 A | * | 11/1984 | Kubo et al. ................... 359/707 |
| 4,871,242 A | * | 10/1989 | Sousa et al. .................. 359/707 |
| 5,253,007 A | * | 10/1993 | Tokura et al. ................. 396/133 |
| 5,463,470 A | * | 10/1995 | Terashita et al. ............. 358/298 |
| 5,962,205 A | * | 10/1999 | Arakawa et al. ............. 430/503 |
| 6,034,759 A | * | 3/2000 | Enomoto ...................... 355/41 |
| 6,259,537 B1 | * | 7/2001 | Matama ......................... 358/1 |

* cited by examiner

Primary Examiner—Bhavesh Mehta
Assistant Examiner—Kanji Patel
(74) Attorney, Agent, or Firm—Birch, Stewart, Kolasch & Birch, LLP

(57) ABSTRACT

An image data processing portion is configured to include a peripheral light amount correcting portion, a soft-finished image forming portion, a combining portion and an adding ratio setting portion. On the basis of fine scan data that has been subjected to various types of adjustments and corrections by the peripheral light amount correcting portion and the like, soft-finished image data is generated in the soft-finished image forming portion. In the adding ratio setting portion, an adding ratio for the time when fine scan data and soft-finished image data are combined with each other is set in accordance with desired soft-focus intensity. In the combining portion, fine scan data and soft-finished image data are combined with each other at the adding ratio that has been set. A soft-focus image based on image data for output, which has been thus processed and outputted, is outputted with the desired soft-focus intensity.

25 Claims, 6 Drawing Sheets

IMAGE PROCESSING APPARATUS

BACKGROUND OF THE INVENTION

1. Field of the Invention

The present invention relates to an image processing apparatus, and particularly to an image processing apparatus in which image data that is obtained by photoelectric reading of an original image is subjected to predetermined image processing so that image data for output is obtained.

2. Description of the Related Art

There has recently been known technique in which a frame image recorded on a photographic film is read photoelectrically by a reading sensor such as a CCD, and digital image data obtained by the reading is subjected to image processing such as enlargement/reduction and various corrections, so that an image is formed on a recording medium by laser light modulated in accordance with the digital image data to which image processing has been effected.

In such technique of reading a frame image digitally by a reading sensor such as a CCD, in order to realize highly accurate reading of an image, a reading condition corresponding to density and the like of the frame image (for example, an amount of light irradiated on the frame image, time of charge accumulated in the CCD, and the like) is determined by preliminary reading of the frame image (so-called pre-scan), and the frame image is read again under the determined reading condition (so-called fine scan).

At this point, original image data (fine scan data) obtained by executing fine scan may be subjected to image processing so that a soft-focus image is formed.

In this case, high-frequency components and medium-frequency components are first eliminated with the use of a filter from original image data that is obtained by executing fine scan, thereby extracting original image data consisting only of low-frequency components so as to generate soft-finished image data. In other words, soft-finished image data that represents a soft-finished image, in which sharpness of an original image is reduced, is generated. Subsequently, reproducing image data that is used for reproducing an image is generated by combining soft-finished image data with original image data (fine scan data). By reproducing the image on the basis of the reproducing image data that is thus generated, a soft-focus image can be formed (see Japanese Patent Application Laid-Open (JP-A) No. 9-172600).

However, when image data for output is generated by combining soft-finished image data with original image data so as to form a soft-focus image, as mentioned above, an adding ratio for the time when soft-finished image data and original image data are combined with each other (a ratio of weight of soft-finished image data to original image data when they are combined with each other) as well as a degree of soft-finish of a soft-finished image, in which sharpness of an original image represented by original image data is reduced, are fixed.

Accordingly, a problem exists in that soft-focus intensity of a soft-focus image, which is reproduced in accordance with reproducing image data that is generated by combining soft-finished image data with original image data, is fixed and can not be changed.

SUMMARY OF THE INVENTION

The present invention has been devised to solve the above-described drawbacks and an object thereof is to provide an image processing apparatus in which soft-focus intensity can be changed when a soft-focus image is formed.

In order to achieve the above-described object, there is provided an image processing apparatus of a first aspect of the present invention, comprising: soft-finished image data generating means for generating soft-finished image data representing a soft-finished image in which sharpness of an original image represented by the original image data is reduced, on the basis of original image data; adding ratio setting means for setting an adding ratio for the time when the soft-finished image data that is generated by the soft-finished image data generating means and the original image data are combined with each other; and image data combining means for, on the basis of the adding ratio set by the adding ratio setting means, combining the soft-finished image data with the original image data so as to generate image data for output.

The image processing apparatus according to the first aspect of the present invention includes the soft-finished image data generating means for generating soft-finished image data representing a soft-finished image, in which sharpness of an original image represented by original image data is reduced. The soft-finished image data generating means can generate soft-finished image data, for example, by eliminating, via a filter, high-frequency components and medium-frequency components, which constitute original image data, so as to extract low-frequency components.

Further, the image processing apparatus includes the adding ratio setting means for setting an adding ratio for the time when soft-finished image data and original image data are combined with each other. The adding ratio is a ratio of weight of soft-finished image data to that of original image data when they are combined with each other. The adding ratio setting means can set the adding ratio, for example, by effecting calculating processing on the basis of soft-finished image data and original image data in such a manner that soft-focus intensity of a soft-focus image to be formed becomes a desired value.

Moreover, the image processing apparatus includes the image data combining means for combining soft-finished image data with original image data on the basis of the adding ratio set by the adding ratio setting means, so to generate image data for output. A soft-focus image can be formed by outputting an image through the use of the image data for output generated by the image data combining means. The soft-focus intensity of the soft-focus image is taken into consideration in advance when the adding ratio, for the time when soft-finished image data and original image data are combined with each other, is set. In other words, the adding ratio is set in accordance with the desired soft-focus intensity. For example, if higher soft-focus intensity is required, it can be realized by setting the adding ratio of soft-finished image data high when combining soft-finished image data with original image data. On the other hand, if lower soft-focus intensity is required, it can be realized by setting the adding ratio of soft-finished image data low.

Accordingly, since the adding ratio for the time when soft-finished image data and original image data are combined with each other can be set in accordance with desired soft-focus intensity, soft-focus intensity of a soft-focus image can be changed.

An image processing apparatus according to a second aspect of the present invention further comprises soft-finish-degree changing means for changing a degree of soft-finish of the soft-finished image data generated by the soft-finished image data generating means.

According to the invention of the second aspect, since a degree of soft-finish can be changed for the soft-finished image data alone, which combines the original image data, the same adding ratio can produce varied degrees of soft-finish. Thus, a wider variety of soft-finished image can be obtained.

According to a third aspect of the present invention, the image processing apparatus of the first or second aspect further comprises: face region extracting means for, on the basis of the original image data, extracting a region which corresponds to a face of a person in the original image; and determining means for determining the size of the region which corresponds to the face and which is extracted by the face region extracting means, wherein, on the basis of the size of the region corresponding to the face which size is determined by the determining means, the adding ratio setting means sets the adding ratio for the time when the soft-finished image data and the original image data are combined with each other.

A face of a person in an original image may not be discerned when a region that corresponds to the face of the person is small but a soft-focus image is nevertheless formed with soft-focus intensity being set high. Accordingly, the image processing apparatus according to the third aspect of the present invention includes not only the soft-finished image data generation means, the adding ratio setting means and the image data combining means, but also the face region extracting means for extracting a region that corresponds to a face of a person in the original image and the determining means for determining the size of the extracted region that corresponds to the face. The face region extracting means can, for example, convert original image data into hue and color saturation values for each pixel so that the region corresponding to the face of the person can be extracted on the basis of the distribution information thereof. Further, the determining means can determine the size of the region that corresponds to the face by, for example, counting the number of pixels in the extracted region that corresponds to the face.

The adding ratio setting means provided to the image processing apparatus with the above configuration sets the adding ratio on the basis of the size of the extracted region that corresponds to the face. In other words, when the region that corresponds to the face in the original image is small, the adding ratio is set in such a manner that the soft-focus intensity is made lower. Thus, when the region that corresponds to the face of the person in the original image is small, the soft-focus intensity for the time when the soft-focus image is formed is restricted. Accordingly, it is possible to discern the person reliably in the soft-focus image that has been formed.

According to a fourth aspect of the present invention, the image processing apparatus of any one aspect of the first through third aspects further comprises: outputting means for outputting an image based on image data for output that is generated by the image data combining means; and adding ratio inputting means for inputting correction instructing information that gives an instruction to correct the adding ratio set by the adding ratio setting means, wherein, when the correction instructing information that gives an instruction to correct the adding ratio is inputted via the adding ratio inputting means, the adding ratio setting means corrects the adding ratio in accordance with the inputted information.

The image processing apparatus according to the fourth aspect of the present invention further includes the outputting means for outputting an image based on image data for output. For example, a recording material, a CRT, or the like is used as the outputting means for outputting a soft-focus image. Further, the image processing apparatus also includes the adding ratio inputting means for inputting information that gives an instruction to correct the adding ratio for the time when soft-finished image data and original image data are combined with each other. For example, a keyboard, a mouse, and/or the like are used as the adding ratio inputting means, which allows input of information that gives an instruction to correct the adding ratio when operated by an operator.

In the image processing apparatus with the above configuration, an operator may become aware that correction of the soft-focus intensity is required when he or see sees the soft-focus image outputted by the outputting means. For example, such a situation occurs when a face of a person in the soft-focus image can not be discerned. In this case, the operator inputs information that gives an instruction to correct the adding ratio by the adding ratio inputting means. Accordingly, on the basis of the information that has been inputted, the adding ratio setting means calculates again and corrects the adding ratio for the time when soft-finished image data and original image data are combined with each other. As a result, a soft-focus image having desired soft-focus intensity can be formed.

In a fifth aspect of the present invention, in the image processing apparatus of the second or third aspect, the outputting means is a monitor for displaying the image based on the image data for output, and an image that has been corrected in accordance with the correction instructing information inputted by the adding ratio inputting means or information representing a changed degree of soft-finish that has been changed by the soft-finish-degree changing means is successively displayed on the monitor.

According to the invention of the fifth aspect, since the image that has been corrected in accordance with the correction instructing information or the representing a changed degree of soft-finish is successively displayed on the monitor, the corrected image can be confirmed in real time, thereby enabling to obtain an adequate soft-focus image.

In a sixth aspect of the present invention, in the image processing apparatus of the fifth aspect, the adding ratio inputting means substantially specifies a size of a face of a person in the image displayed on the monitor so that an adding ratio or a degree of soft-finish of the soft-finished image data that is appropriate for the substantially specified face size is set.

According to the invention of the sixth aspect, in most of the cases, soft-focus intensity depends on the size of the face of the person photographed in an image. Since setting can be conducted while checking visually the size of the face on the monitor, precision in extracting the face becomes high. Higher precision in extracting the face can results in an adequate adding ratio of a soft-finished image. It should be noted that occurrence of erroneous extraction can be made less frequent, compared with the case where face extraction is conducted automatically.

In a seventh aspect of the present invention, in the image processing apparatus of the fifth or sixth aspect, an image is displayed on the monitor on the basis of low resolution image data that is prepared from the image data for output, and at least one of the adding ratio and the degree of soft-finish of the soft-finished image data is reset in such a manner that a result of display of the image based on the low resolution data is equivalent to a degree of soft-focus of an image that is actually outputted.

According to the invention of the seventh aspect, when an image is displayed on the monitor, low resolution data is used for monitor display so as to shorten display access time and reduce a memory amount, because it requires time before the image is displayed and require a vast amount of memory if high resolution data is used. At the same time, since the degree of soft-finish of what is displayed by the low resolution data is made coincide with that of the image that is actually outputted, for example, difference between them will no longer be felt at the time of printing.

It should be noted that in the seventh aspect, low resolution data for monitor display may be newly prepared. However, pre-scan data can be used for monitor display if, in reading the image, an image reading apparatus is applied wherein pre-scan is firstly carried out at relatively low resolution so as to see the condition of the image, and light amount for reading is then adjusted in accordance with the pre-scan so that fine scan is carried out at relatively high resolution.

According to an eighth aspect of the present invention, the image processing apparatus of the sixth aspect comprises: soft-finished image data generating means for generating soft-finished image data representing a soft-finished image in which sharpness of an original image represented by the original image data is reduced in accordance with a degree of soft-finish that is set in advance, on the basis of original image data; soft-finish-degree setting means for setting, with respect to the original image, a degree of soft-finish of the soft-finished image represented by the soft-finished image data, which is generated by the soft-finished image data generating means; and image data combining means for combining the soft-finished image data that is generated by the soft-finished image data generating means with the original image data so as to generate image data for output.

The image processing apparatus according to the eighth aspect of the present invention includes the soft-finished image data generating means for generating soft-finished image data representing a soft-finished image, in which sharpness of an original image represented by original image data is reduced in accordance with a degree of soft-finish that is set in advance. The degree of soft-finish is a degree in which soft-finish of a soft-finished image represented by soft-finished image data is generated to an original image, and is set by the soft-finish-degree setting means. The soft-finish-degree setting means can set the degree of soft-finish on the basis of soft-focus intensity of a soft-focus image to be formed. For example, if higher soft-focus intensity is required, it can be realized by setting, with respect to an original image, high the degree of soft-finish of a soft-finished image represented by soft-finished image data. On the other hand, if lower soft-focus intensity is required, it can be realized by setting the degree of soft-finish low. Further, the image processing apparatus includes the image data combining means for combining soft-finished image data with original image data so as to generate image data for output, and a soft-focus image can be formed by outputting an image through the use of the image data for output that is generated by the image data combining means.

Accordingly, since the degree of soft-finish of the soft-finished image represented by soft-finished image data with respect to the original image can be set in accordance with desired soft-focus intensity, soft-focus intensity of a soft-focus image can be changed.

According to a ninth aspect of the present invention, the image processing apparatus of the eighth aspect further comprises: face region extracting means for on the basis of the original image data, extracting a region which corresponds to a face of a person in the original image; and determining means for determining the size of the region which corresponds to the face and is extracted by the face region extracting means, wherein, on the basis of the size of the region corresponding to the face which size is determined by the determining means, the soft-finish-degree setting means sets, with respect to the original image, the degree of soft-finish of the soft-finished image represented by the soft-finished image data.

A face of a person in an original image may not be discerned when a region that corresponds to the face of the person is small but a soft-focus image is nevertheless formed with soft-focus intensity being set high. In other words, the face of the person may not be discerned in the soft-focus image that is formed with the degree of soft-finish being set high. Thus, according to the ninth aspect of the present invention, the soft-finish-degree setting means sets the degree of soft-finish on the basis of the size of the region that corresponds to the face of the person in the original image and is extracted by the face region extracting means, which is determined by the determining means. For example, when the extracted region that corresponds to the face of the person is small, the degree of soft-finish is set low so that soft-focus intensity is made lower. As a result, it is possible to discern the person reliably even in the soft-focus image that is formed when the region corresponding to the face of the person in the original image is small.

According to a tenth aspect of the present invention, the image processing apparatus of the eighth or ninth aspect further comprises: outputting means for outputting an image based on image data for output that is generated by the image data combining means; and soft-finish-degree inputting means for inputting information that gives an instruction to correct the degree of soft-finish which is set by the soft-finish-degree setting means, wherein, when the information that gives the instruction to correct the degree of soft-finish is inputted via the soft-finish-degree inputting means, the soft-finish-degree setting means corrects the degree of soft-finish in accordance with the inputted information.

According to the image processing apparatus of the tenth aspect of the present invention, an operator may determine that correction of soft-focus intensity is required when he or see sees the soft-focus image outputted by the outputting means. In this case, the operator inputs information that gives an instruction to correct a degree of soft-finish by the soft-finish-degree inputting means such as a keyboard and/or a mouse. When the information that gives the instruction to correct the degree of soft-finish is thus inputted, the soft-finish-degree setting means corrects the degree of soft-finish of the soft-finished image represented by soft-finished image data, with respect to the original image, on the basis of the information that has been inputted. As a result, a soft-focus image having desired soft-focus intensity can be formed.

In an eleventh aspect of the present invention, in the image processing apparatus of any one aspect of the aspects 1 through 9, the image data combining means forms soft-finished images of respective colors of R, G, and B of the original image, and carries out a combining operation on each of the respective soft-finished images of the respective colors of R, G, and B of the original image.

According to the invention of the eleventh aspect, since each color of R, G, and B of the original image presents a varying degree of conspicuousness to person's eyes, a soft-finished image is generated and combined for each color. This method of generating a soft-finished image is conventional, which obviates the need to add other colors for obtaining a soft-focus image.

In a twelfth aspect of the present invention, in the image processing apparatus of any one aspect of the aspects 1 through 9, the image data combining means form a soft-finished image corresponding to a Y signal, and combines the soft-finished image corresponding to the Y signal with each of R, G, and B colors of the original image, respectively.

According to the invention of the twelfth aspect, by using the Y signal to which each color of R, G, and B of the original image is allocated, only one soft-finished image data is required, thereby simplifying the processing.

The following are the examples that may be used as the ratios of the respective colors of R, G, and B of the original image for generating the Y signal:

(1) Y=0.3R+0.6G+0.1B
(2) Y=0.33R+0.33G+0.33B

DESCRIPTION OF THE PREFERRED EMBODIMENTS

Referring now to the attached drawings, an embodiment of a first embodiment of the present invention will be hereinafter described. It should be noted that the following description will be given of a digital laboratory system according to the first embodiment.

Overview of Entire System

Figure 1:
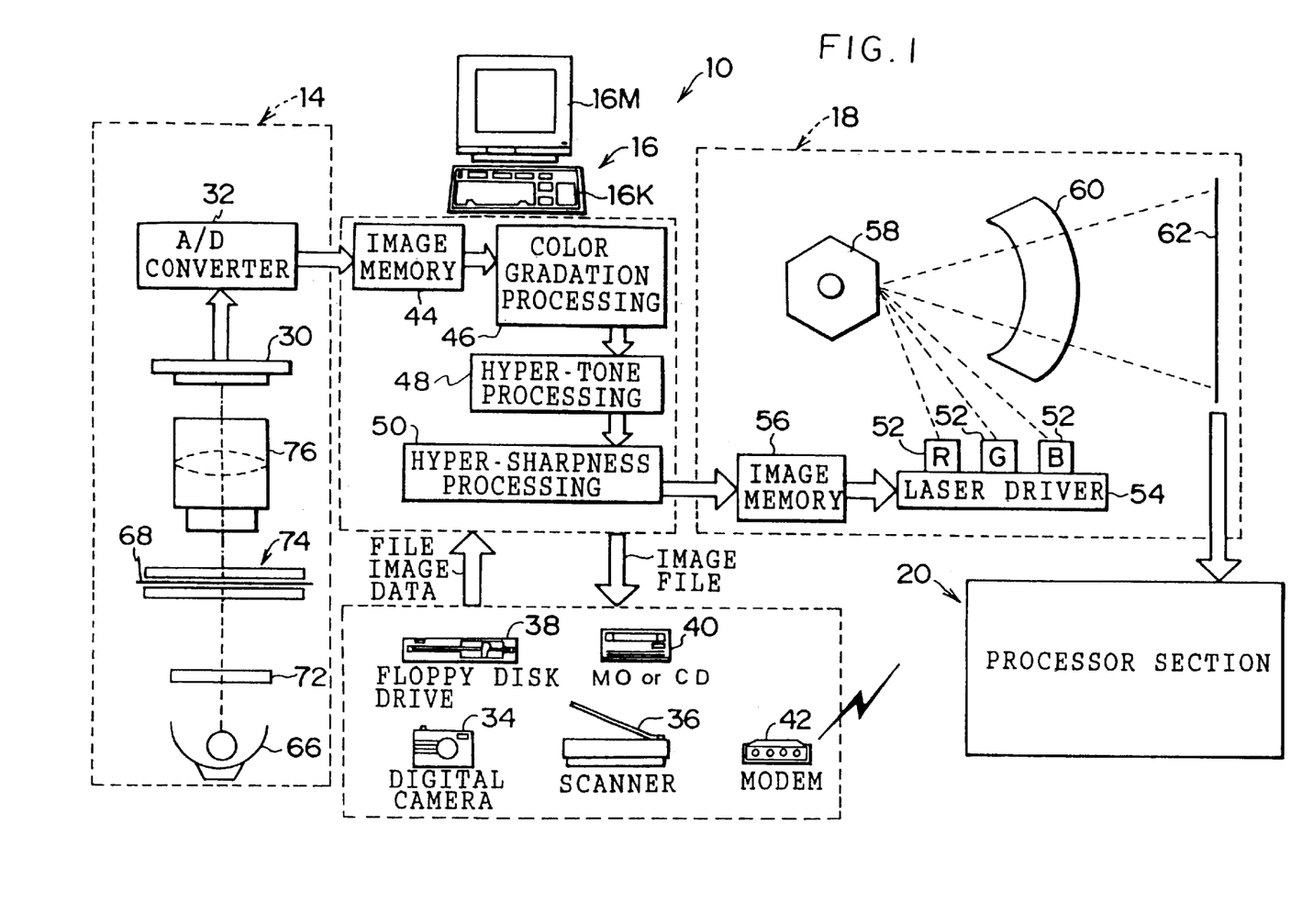
FIG. 1 is a schematic block diagram of a digital laboratory system according to a first embodiment of the present invention.
Figure 2:
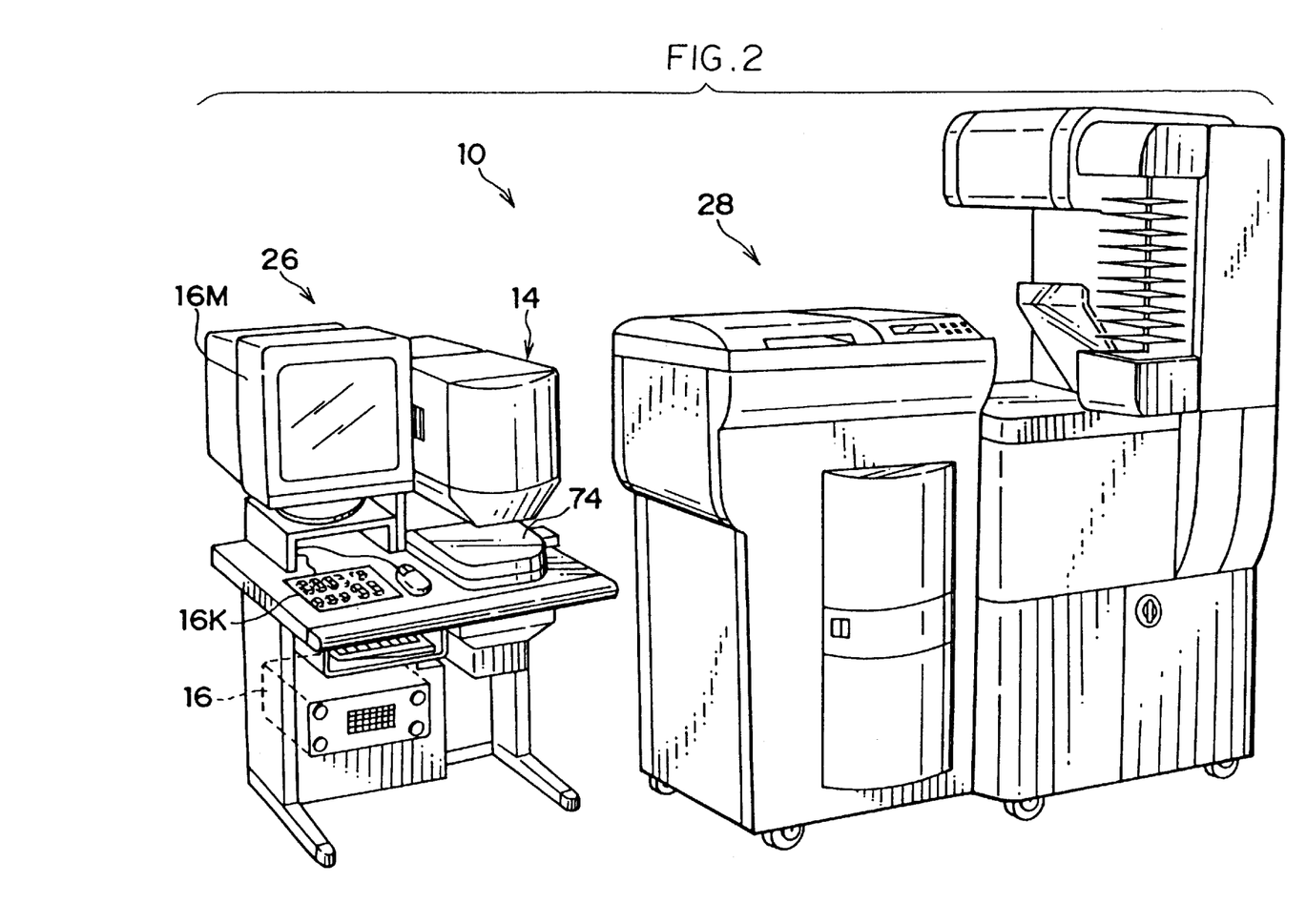
FIG. 2 is an outside view of the digital laboratory system.

FIGS. 1 and 2 show a schematic structure of a digital laboratory system 10 according to the embodiment of the present invention.

As shown in FIG. 1, the digital laboratory system 10 is configured to include a line CCD scanner 14, an image processing section 16, a laser printer section 18, and a processor section 20. The line CCD scanner 14 and the image processing section 16 are integrated to form an input section 26 shown in FIG. 2, and the laser printer section 18 and the processor section 20 are integrated to form an output section 28 shown in FIG. 2.

The line CCD scanner 14 is used to read a frame image recorded on a photographic film such as a negative film or a reversal film. Examples of the photographic film on which a frame image to be read is recorded include a 135 size photographic film, a 100 size photographic film, a photographic film with a transparent magnetic layer formed thereon (i.e., a 240 size photographic film: a so-called APS film), and 120 size and 220 size photographic films (Brownie size). The line CCD scanner 14 reads the frame image to be read, as described above, by a line CCD 30 and, after effecting A/D conversion in an A/D converting portion 32, outputs image data to the image processing section 16.

It should be noted that in the first embodiment, a description will be given of the digital laboratory system 10 to which the 240 size photographic film 68 (the APS film) is applied.

The image processing section 16 is configured not only to allow input of image data outputted from the line CCD scanner 14 (i.e., scanned image data), but also to allow input of image data obtained by photographing using a digital camera 34 or the like, image data obtained by reading an original (for example, an reflection original or the like) by a scanner 36 (a flat-bed type), image data generated by another computer and recorded in a floppy disk drive 38, or a MO drive or CD drive 40, communication image data received via a modem 42, and the like (which will be generically referred to as file image data) from the outside.

The image processing section 16 stores the input image data in an image memory 44 so that image processing including various corrections and the like is effected in a color gradation processing portion 46, a hyper-tone processing portion 48, a hyper-sharpness processing portion 50, etc., and outputs the image data, as recording image data, to the laser printer section 18. Further, the image processing section 16 also can output the image data subjected to the image processing, as an image file, to the outside (for example, the image data can be outputted to a storage medium such as a FD, MO, CD or the like, or transmitted to the other information processing equipment via a communication line).

The laser printer section 18 includes laser light sources 52 of R, G, and B, and, by controlling a laser driver 54, causes laser light modulated to correspond to the recording image data inputted from the image processing section 16 (which is temporarily stored in the image memory 56) to be irradiated on a photographic printing paper 62 so as to record an image on the photographic printing paper 62 by scan exposure processing (in the first embodiment, generally with an optical system in which a polygon mirror 58 and a fθ lens 60 are used). Further, the processor section 20 effects various processing including color development, bleach-fix, washing, and drying for the photographic printing paper 62 on which the image is recorded by the scan exposure processing in the laser printer section 18. As a result, the image is formed on the photographic printing paper 62.

Structure of Line CCD Scanner

Next, a description will be given of the structure of the line CCD scanner 14. FIG. 1 shows a schematic structure of an optical system of the line CCD scanner 14. This optical system includes a light source 66 for irradiating light to a photographic film 68. A light diffusion panel 72, by which the light to be irradiated on the photographic film 68 is made into diffused light, is disposed at a light emission side of the light source 66.

The photographic film 68 is conveyed by a film carrier 74 disposed at the side at which the light diffusion panel 72 is provided in such a way that the image plane of a frame image is made perpendicular to an optical axis.

A lens unit 76, which allows imaging of light transmitted through the frame image, and the line CCD 30 are disposed, sequentially along the optical axis, at the side of the photographic film 68 oppose to the side at which the light source 66 is disposed. It should be noted that although a single lens is merely shown as the lens unit 76, the lens unit 76 is actually a zoom lens formed from a plurality of lenses. Alternatively, a cellphonic lens may be used as the lens unit 76. In this case, it is preferable that the respective end surfaces of the cellphonic lens are disposed as close as possible to the photographic film 68 and the line CCD 30.

The line CCD 30 is configured in such a manner that a sensing portion, at which a plurality of CCD cells are disposed in one row along the transverse direction of the photographic film 68 to be conveyed and an electronic shutter mechanism is disposed, is provided in each of three lines which are parallel to each other at intervals, and color separation filters of R, G, and B are respectively mounted on the light-incidence sides of the sensing portions (i.e., the line CCD 30 is a so-called three-line color CCD). The line CCD 30 is disposed in such a manner that a light receiving surface of each sensing portion coincides with the position of an imaging point of the lens unit 76.

Further, although an illustration thereof will be omitted, a shutter is provided between the line CCD 30 and the lens unit 76.

Structure of Control System of Image Processing Section 16

Figure 3:
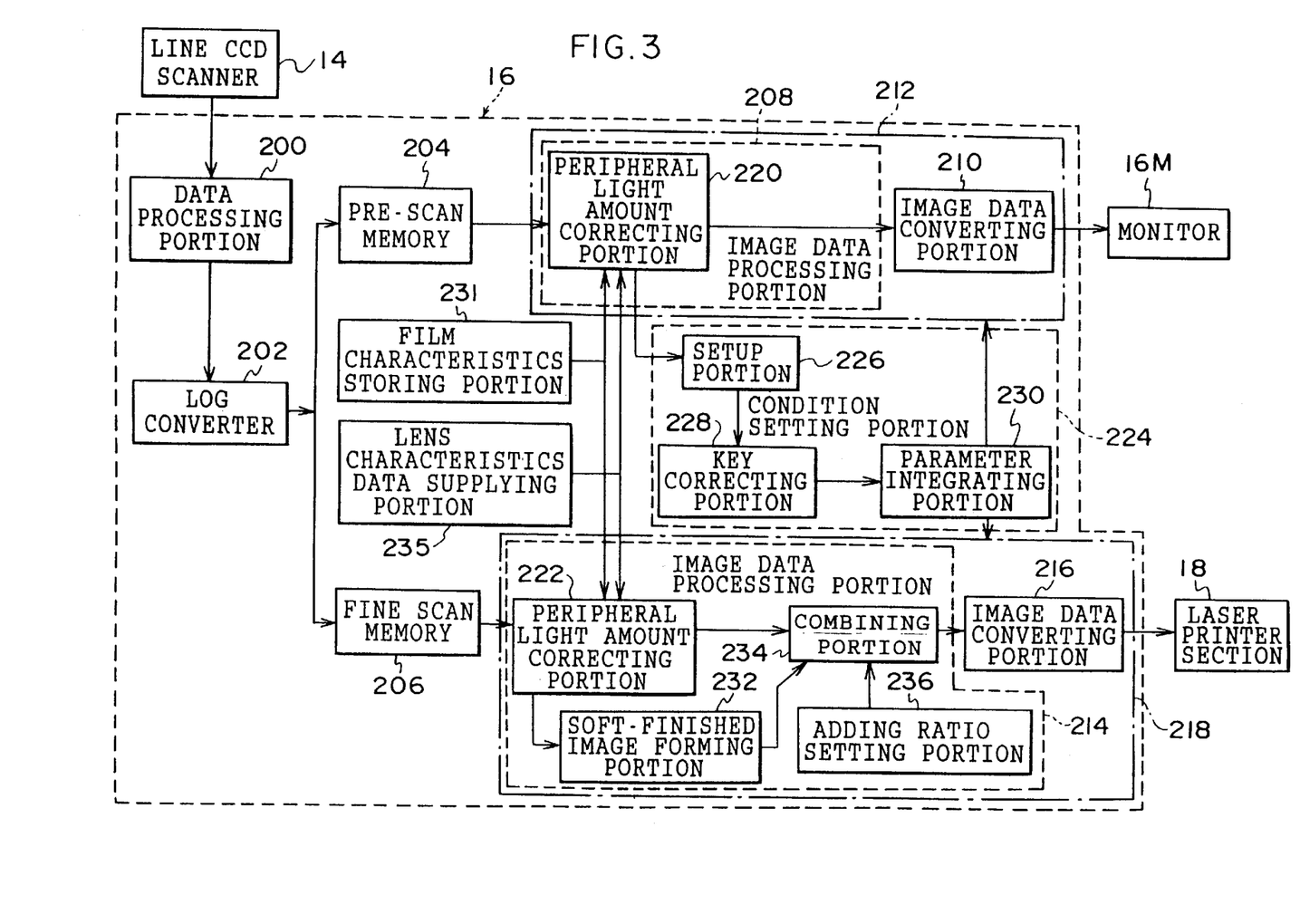
FIG. 3 is a control block diagram of an image processing section.

In FIG. 3, a detailed control block diagram for executing various processings in the image memory 44, a color gradation processing portion 46, a hyper-tone processing portion 48, and a hyper-sharpness processing portion 50 which comprise a main structure of the image processing section 16 illustrated in FIG. 1.

In a data processing portion 200, predetermined data processing such as dark correction, detective-pixel correction, and shading corrections are effected to the respective digital signals R, G, and B that are outputted from the line CCD scanner 14. Then, the data-processed signals are converted into digital image data (density data) by a log converter 202. Pre-scan data is stored in a pre-scan memory 204 and fine scan data is stored in a fine scan memory 206.

The pre-scan data stored in the pre-scan memory 204 is transmitted to a pre-scan processing portion 212 composed of an image data processing portion 208 and an image data converting portion 210. In the meantime, the fine scan data stored in the fine scan memory 206 is transmitted to a fine scan processing portion 218 composed of an image data processing portion 214 and an image data converting portion 216.

In the pre-scan processing portion 212 and the fine scan processing portion 218, corrections and the like on the basis of the lens characteristics at the time when an image is photographed and the electronic flash distribution characteristics for the time when an electric light is used for photographing are executed. In addition to the above processing, in the fine scan processing portion 218, processing for forming output image data, which is used to form a soft-focus image, is executed.

In the image date processing portions 208 and 214, color balance adjustment, contrast adjustment (color gradation processing), brightness correction, color saturation correction (hyper-tone processing), hyper-sharpness processing, and the like are executed in well-known methods such as the LUT or matrix (MTX) operation.

Further, the image data processing portions 208 and 214 include peripheral light amount correcting portions 220 and 222 for correcting a light amount of the periphery (background) of an image prior to the above-described various adjustments, corrections, and the like. In the peripheral light amount correcting portions 220 and 222, lack of the light amount of the periphery (background) compared with a main subject (such as a person) is corrected on the basis of the lens characteristics.

The image data processing portion 214 of the fine scan processing portion 218 is configured to include the above-described peripheral light amount correcting portion 222, a soft-finished image forming portion 232, a combining portion 234, and an adding ratio setting portion 236.

The soft-finished image forming portion 232 is connected to the peripheral light amount correcting portion 222. An unillustrated filter (an IIR filter) is provided to the soft-finished image forming portion 232, which eliminates high-frequency components and medium-frequency components of the fine scan data that has been subjected to the adjustment and corrections by the peripheral light amount correcting portion 222 and the like. As a result, the soft-finished image forming portion 232 outputs fine scan data that has only low-frequency components. The fine scan data that has only the low-frequency components is soft-finished image data representing a soft-finished image in which sharpness of the frame image represented by the fine scan data that has not passed the filter is reduced. In other words, the soft-finished image forming portion 232 generates and outputs soft-finished image data that represents a soft-finished image. In general, a degree of reduction in sharpness (a degree of soft-finish) is attained at a predetermined default value. However, it is also possible to change a degree of reduction in sharpness with an operator's manual operation. Further, when face extraction, which will be described later, is carried out, the default value or the manual operation value may be automatically adjusted on the basis of the face extracting region.

The combining portion 234 is connected to the peripheral light amount correcting portion 222 and the soft-finished image forming portion 232. Therefore, the fine scan data subjected to the adjustments and corrections by the peripheral light amount correcting portion 222 and the like and the soft-finished image data generated by the soft-finished image forming portion 232 are inputted to the combining portion 234. In the combining portion 234, combined image data is generated by combining the fine scan data with the soft-finished image data so that the resulting combined image data is outputted to the image data converting portion 216.

The adding ratio setting portion 236 is connected to the combining portion 234. The adding ratio setting portion 236 sets an adding ratio for the time when fine scan data and soft-finished image data are combined with each other. The adding ratio is the ratio of weight of fine scan data and that of soft-finished image data for the time when they are combined with each other, and is set in correspondence to soft-focus intensity of a soft-focus image outputted by the laser printer section 18. Thus, the combining portion 234 combines fine scan data and soft-finished image data (for example, a default value) with each other on the basis of the adding ratio set by the adding ratio setting portion 236 so as to output combined image data.

In the image data converting portion 210 of the pre-scan side, image data processed by the image data processing portion 208 is converted into displaying image data for displaying the processed image data on a monitor 16M on the basis of the 3D-LUT. In the meantime, in the image data converting portion 216 of the fine scan side, image data processed by the image data processing portion 214, in other words, combined image data outputted from the combining portion 234, is converted into printing image data for the laser printing section 18 on the basis of the 3D-LUT. It should be noted that although the displaying image data and the printing image data, as described above, have different color coordinate systems, correction is made in an attempt to match them.

A condition setting portion 224 that is composed of a setup portion 226, a key correcting portion 228, and a parameter integrating portion 230 is connected to the pre-scan processing portion 212 and the fine scan processing portion 218.

Figure 4:
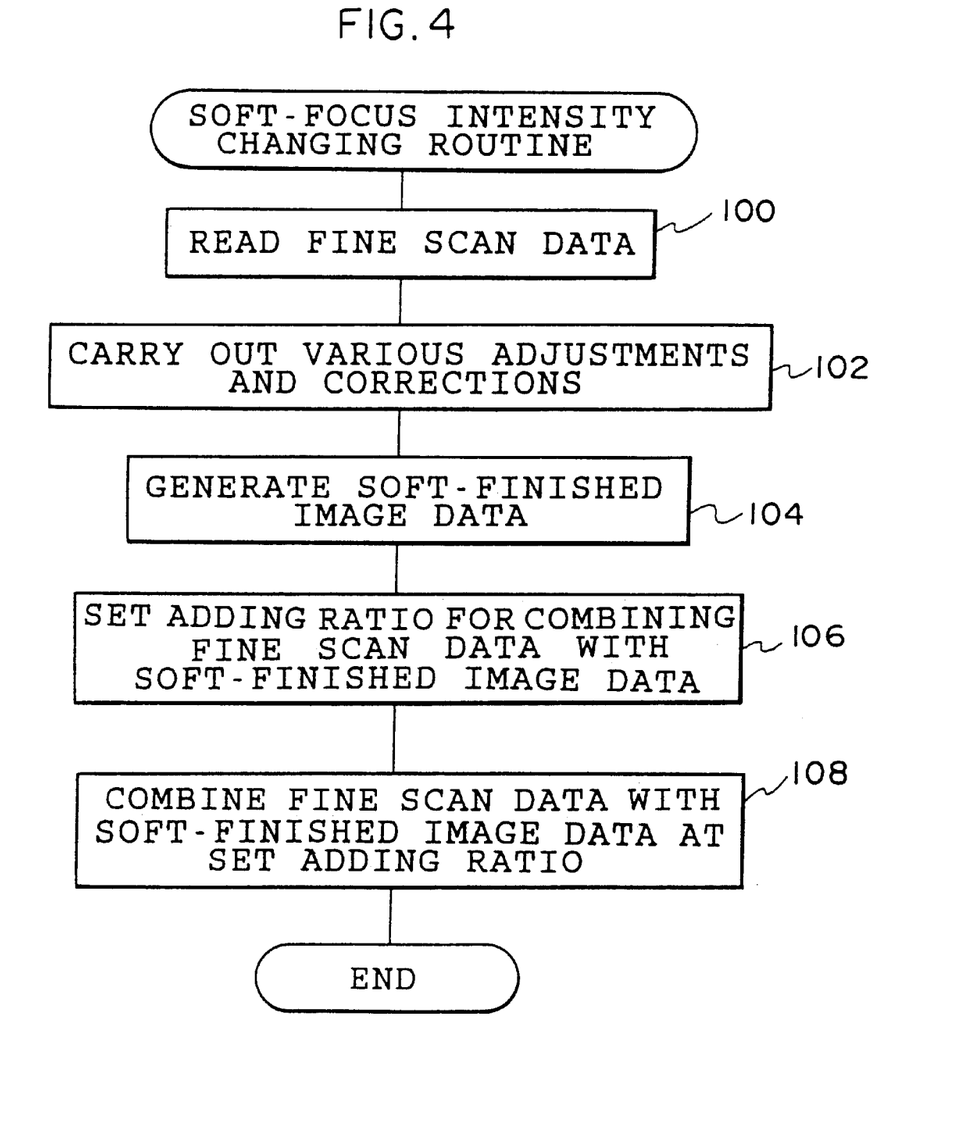
FIG. 4 is a flow chart which shows a soft-focus intensity changing routine according to the first embodiment.

The setup portion 226 is configured to include a microcomputer that is composed of a CPU, a ROM, a RAM and an input/output port, which are not illustrated, and stores in advance a soft-focus intensity changing routine shown in FIG. 4. The setup portion 226 sets a reading condition for the time when fine-scan is executed by utilizing pre-scan data and supplies the reading condition to the line CCD scanner 14. Further, the setup portion 226 calculates image processing conditions of the pre-scan processing portion 212 and the fine scan processing portion 218 and supplies the image processing conditions to the parameter integrating portion 230.

The key correcting portion 228 calculates the amount of adjustment of the image processing conditions in response to various instructions and the like inputted by keys and/or a mouse for adjusting density, color, contrast, sharpness, color saturation, and the like that are set at the keyboard 16K. The calculated amount of adjustment is then supplied to the parameter integrating portion 230.

In the parameter integrating portion 230, the image processing conditions received from the setup portion 226 and key correcting portion 228, as described above, are transmitted to the image data processing portions 208 and 214 of the pre-scan side and of the fine scan side, respectively, thereby allowing correction or resetting of the image processing conditions.

Further, a film characteristics storing portion 231 for storing characteristics of various films is connected to the condition setting portion 224. The film characteristics are the gradation characteristics (the γ characteristics) that are generally represented by a curve in which density is changed three-dimensionally in accordance with an amount of light exposure.

Since this is a well known art, a detailed explanation thereof will be omitted.

Meanwhile, in the first embodiment, the film type can be identified by reading information indicating the film type, which is recorded on a magnetic recording layer of the APS film, with a magnetic head when the film is conveyed by the carrier 74 of the line CCD scanner 14. Further, in a case of the 135 size film, the film type may be determined from a configuration (in which perforations are provided at relatively short pitches at both ends of the film in the transverse direction thereof) and the like, or may be keyed by an operator.

Moreover, a lens characteristics data supplying portion 235 is connected to the condition setting portion 224. The lens characteristics data supplying portion 235 obtains information for determining a camera that was used for photographing with the film, and supplies lens characteristics corresponding to the camera, which is used for photographing and corresponds to information obtained for determination, to the peripheral light amount correction portions 220 and 222.

In other words, the lens characteristics data supplying portion 235 has a memory (a table) in which light distribution characteristics of lenses corresponding to a variety of types of cameras are stored. (Here, the lenses include, for example, all types of lenses that are applied to LFs (lens-fitted film packages), electronic flashes mounted on general cameras, and interchangeable lenses. However, in the first embodiment, the lens for the LF is a main target for correction.) Since the light distribution characteristics vary depending on a photographing distance, a plurality of light distribution characteristics that correspond to the photographing distances for the respective electronic flashes are stored.

When peripheral light amount correction is effected on the basis of the above lens characteristics, variation of a light amount between the person that is the main subject and the background can be reduced.

In the lens characteristics data supplying portion 235, the light distribution characteristics are read out in accordance with the obtained lens characteristics data (for example, in a case of the lens characteristics of a lens-fitted film package, the further the lens is disposed away from the center of an image, the more an attenuating light amount $\Delta logE$ is increasing (in a minus trend)). Then, the light distribution characteristics that are read out are supplied to the peripheral light amount correcting portions 220 and 222. It should be noted that in a case of the APS film, the photographing distance may be recorded on the magnetic recording layer. Further, in a case of the 135 size film, the photographing distance may be recorded optically or recorded on a separate recording medium.

Operation of First Embodiment

Next, operation of the present embodiment will be hereinafter described.

When the operator inserts the photographic film 68 into the film carrier 74 and gives an instruction to start frame image reading using the keyboard 16K of the image processing section 16, the film carrier 74 starts to convey the photographic film 68. This conveying action causes pre-scan to be executed. In other words, not only frame images but a variety of data outside of image recording regions of the photographic film 68 are read by the line CCD scanner 14 while the photographic film 68 is conveyed at relatively high speed. Thus, information on the film type of the photographic film 68 and information on the lens for photographing that is mounted on the camera, which are recorded on the magnetic recording layer, are simultaneously read. When the size of the frame image recorded on the photographic film 68 is found to be, for example, that of a panorama-sized frame image, unexposed areas that are characteristic of the panorama-sized images (both end sides of the photographic film in the transverse direction thereof) are light-shielded for reading.

When pre-scan data is stored in the pre-scan memory 204, various adjustments such as color balance adjustment and contrast adjustment and various corrections such as brightness correction and color saturation correction are effected in the pre-scan data processing section 212. Meanwhile, the peripheral light amount correcting portion 220 reads out pre-scan data so as to effect peripheral light amount correction. The image based on displaying image data, in which the pre-scan data has been subjected to the corrections, is displayed on the monitor 16M.

When the pre-scan is completed, the reading condition for the time when fine scan is executed is set for each frame image on the basis of the result of pre-scan of each frame image.

Subsequently, when the setting of the reading condition for the time when fine scan is executed is completed for all the frame images, the photographic film 68 is conveyed in the reverse direction to the direction in which the photographic film 68 is pre-scanned, thereby allowing execution of fine scan of each frame image.

At this point, since the photographic film 68 is conveyed in the reverse direction to the direction in which the photographic film 68 is pre-scanned, fine scan is executed sequentially from the last frame to the first frame. The conveying speed of fine scan is set slower than that of the above-described pre-scan. Accordingly, a higher reading resolution is achieved. Further, since the conditions of the image (for example, an aspect ratio of the image to be photographed, photographing conditions such as "under", "normal", "over", "super-over", etc., photographing with or without the use of an electronic flash, and the like) have been recognized at the time of pre-scan, reading can be carried out under a proper reading condition.

Fine scan is effected in a substantially same manner as pre-scan. Signals outputted from the line CCD 30 are converted into digital signals by the A/D converter 32. The digital signals are then processed at the data processing portion 200 of the image processing section 16 so as to be converted into fine scan data by a log converter 202 and transmitted to the fine scan memory 206.

After transmitted to the fine scan memory 206, the fine scan data is read out by the fine scan processing portion 218 where various processings including the image processing similar to the processing carried out in the above-described pre-scan processing portion 212 are effected. One of them is the processing in which soft-focus intensity of a soft-focus image to be formed is changed. The processing will be hereinafter described by referring to the soft-focus intensity changing routine illustrated in FIG. 4. It should be noted that the soft-focus intensity changing routine illustrated in FIG. 4 has been stored in advance in the setup portion 226, and is executed when an unillustrated sensor detects that fine scan has been completed.

When fine scan is completed, fine scan data that has been stored in the fine scan memory 206 is first read in step 100. In the subsequent step 102, light amount correction by the peripheral light amount correcting portion 202, various adjustments such as color balance adjustment and contrast adjustment, and various corrections such as brightness correction and color saturation correction are effected to fine scan data and the process proceeds to step 104.

In step 104, the soft-finished image forming portion 232 generates soft-finished image data. Soft-finished image data is generated by passing the fine scan data, which has been subjected to various adjustments, corrections and the like, through an unillustrated filter so that the high-frequency components and medium-frequency components are eliminated from the components that constitute the fine scan data, thereby allowing the fine scan data to consist of the low-frequency components only. In other words, it is fine scan data consisting of the low-frequency components only that corresponds to soft-finished image data.

In the subsequent step 106, the adding ratio for the time when fine scan data and soft-finished image data are combined with each other is set. The setting of the adding ratio is carried out by the adding ratio setting portion 236. For example, when the operator inputs desired soft-focus intensity by operating the keyboard 16K, the adding ratio setting portion 236 calculates and sets the adding ratio on the basis of fine scan data and soft-finished image data in such a manner that the soft-focus intensity equals to the desired value (the input value).

After the adding ratio has been set, in step 108, fine scan data and soft-finished image data are combined with each other on the basis of the adding ratio that has been set, thereby generating combined image data and terminating the present routine.

The combined image data generated at the image data processing portion 214 is outputted to the image data converting portion 216. In the image data converting portion 216, the combined image data is converted into image data with a color coordination system that is suitable for the laser printer section 18 (printing image data) so as to be outputted.

In the laser printer section 18, the image is outputted on a recording material on the basis of the printing image data.

As a result, a soft-focus image having the desired soft-focus intensity is recorded on the recording material.

As can be seen from the above description, since the adding ratio for the time when fine scan data and soft-finished image data are combined with each other can be set in accordance with the desired soft-focus intensity, the soft-focus intensity of the soft-focus image can be changed.

When the soft-focus intensity is set high in a case where a region that corresponds to a face of a person in a frame image recorded on a photographic film is small, the person's face may not be discerned in the soft-focus image that is formed. For this reason, the image processing apparatus of the present invention may be configured in such a manner that the region that corresponds to the face of the person in the frame image has been extracted in advance, so that the soft-focus intensity can be changed on the basis of the size of the extracted region that corresponds to the face. In other words, the adding ratio for the time when fine scan data and soft-finished image data are combined with each other may be set on the basis of the size of the extracted region that corresponds to the face. At this point, if the extracted region of the face is small, the adding ratio is set in such a manner that the soft-focus intensity is made lower. As a result, it is assured that the person's face can be discerned even in the soft-focus image that is formed when the region that corresponds to the face of the person in the frame image is small.

Further, the operator may determine that, when he or she visually inspects the soft-focus image outputted by the laser printer section 18, correction of the soft-focus intensity, namely, correction of the adding ratio for the time when fine scan data and soft-finished image date are combined with each other, is required. In this case, information that gives an instruction to correct the adding ratio is inputted by inputting means such as a keyboard and/or a mouse, and on the basis of the inputted information, fine scan data and soft-finished image data, the adding ratio is calculated again in the adding ratio setting portion so that the correction is effected. Fine scan data and soft-finished image data are combined with each other by the adding ratio that is thus corrected, thereby generating the combined image data. Then, the soft-focus image having the desired soft-focus intensity can be outputted by outputting the image on the basis of the printing image data that has been converted by the image data converting portion 216.

In the first embodiment, there has been described an example in which soft-finished image data that is generated by the soft-finished image forming portion is always the same and the soft-focus intensity of the soft-focus image can be changed by setting the adding ratio, for the time when fine scan data and soft-finished image data are combined with each other, in accordance with the soft-focus intensity. However, the image processing apparatus of the present invention is not limited to the above configuration. For example, the image processing apparatus may be configured in such a manner that the adding ratio for the time when fine scan data and soft-finished image data are combined with each other is set at a predetermined (regular) value and soft-finished image data generated at the soft-finished image forming portion is set in accordance with the soft-focus intensity, so that the soft-focus intensity of the soft-focus image can be changed. This configuration will be hereinafter described.

The soft-finished image data is the data representing a soft-finished image in which sharpness of the frame image represented by fine scan data is reduced. The soft-finished image data is generated on the basis of fine scan data that is obtained by reading a frame image. At this point, a degree of soft-finish of the soft-finished image to the frame image, which is represented by soft-finished image data, is set in accordance with the desired soft-focus intensity for generating the soft-finished image data. Combined image data is generated by combining the soft-finished image data, which has been thus generated, with the fine scan data by the predetermined adding ratio. Then, the soft-focus image having the desired soft-focus intensity can be outputted by outputting the image on the basis of the printing image data that has been converted by the image data converting portion. In other words, when the degree of soft-finish of the soft-finished image to the frame image, is set in accordance with the soft-focus intensity, the soft-focus intensity of the soft-focus image can be changed, in the same manner as the above-mentioned case where the adding ratio is set in accordance with the soft-focus intensity.

Further, the image processing apparatus may be configured in such a manner that the soft-focus intensity of the soft-focus image can be changed by setting both of the adding ratio for the time when fine scan data and soft-finished image data are combined with each other and the degree of soft-finish of the soft-finished image to the frame image, which is represented by the soft-finished image data.

Moreover, in the first embodiment, there has been also shown an example in which the intensity of the soft-focus image can be changed at will so that the adding ratio or the degree of soft-focus can be set accordingly. However, the image processing apparatus of the present invention is not limited to the above configuration. For example, several stages of intensity of the soft-focus image (for example, "weak", "weak-to-medium", "medium", "medium-to-strong", "strong", etc.) may be provided in advance so that the adding ratio or the degree of soft-finish corresponding to the respective stages are stored in advance, thereby allowing reading-out and setting of a predetermined adding ratio or a degree of soft-finish in accordance with the soft-focus intensity that is to be changed. It should be noted that the method of providing the several stages of the intensity of the soft-focus images is effective, as described above, except when the region that corresponds to the face of the person in the frame image is extracted in advance so that the soft-focus intensity is changed on the basis of the size of the extracted region that corresponds to the face.

The Second Embodiment

A second embodiment of the present invention will be hereinafter described. It should be noted that in the second embodiment, the structure of an entire system is the same as that of the first embodiment described above. Therefore, the FIGS. 1 through 3 of the first embodiment will also be used and the description of the structure will be omitted in the second embodiment, with like reference numerals denoting like elements as occasion demands.

The second embodiment is characterized in that the monitor 16M of the image processing section 16 (see FIG. 1) is used for obtaining a soft-focus image so that an appropriate adding ratio is set by watching an image displayed on the monitor 16M.

At this point, in the second embodiment, following the application of monitor 16M, a table (LUT) at which soft-finished image adding ratios to the sizes of the face has been registered is provided in advance. On the monitor 16M, a frame with a predetermined size and aspect ratio that can be changed properly by an operation of the keyboard 16K or the mouse is displayed in such a manner that the frame overlaps the image, so as to allow setting of the frame that is the smallest but includes a face of a person in the image. In accordance with the size of the frame, the optimum image adding ratio is selected from the above-described LUT for setting. Further, the degree of soft-finish of the soft-finished image whose sharpness is reduced and which is combined with the original image is generated from a default value or an arbitrary value that has been changed by an operator. However, the degree of soft-finish of the soft-finished image can be changed again (reset) automatically or manually, in accordance with the size of the frame.

Further, the image to be displayed on the monitor 16M is displayed on the basis of low resolution data at the time of pre-can.

The soft-focus image combined at the image adding ratio that have been set in the above-described manner is sequentially displayed on the monitor 16M.

At this point, since the image to be displayed on the monitor 16M is based on low resolution data and image data to be actually outputted is high resolution data, a correction value is provided in advance for the difference between the soft-focus images, which is caused by the difference of data. As a result, the difference of color tone and the like is prevented from being produced between the image to be displayed on the monitor 16M and the image to be actually outputted.

Figure 5A:
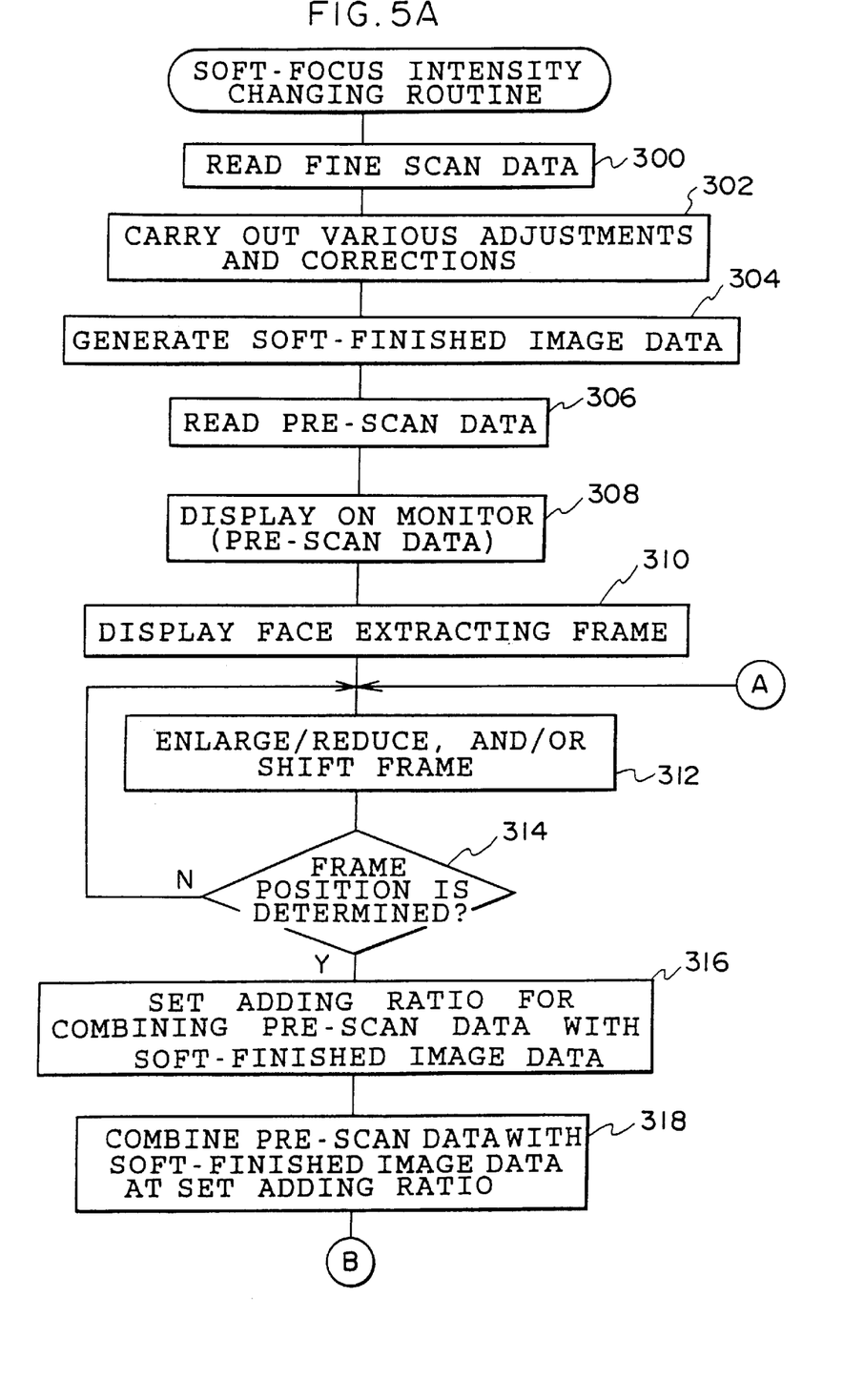
FIGS. 5A and 5B are flow charts which show a soft-focus intensity changing routine according to a second embodiment.
Figure 5B:
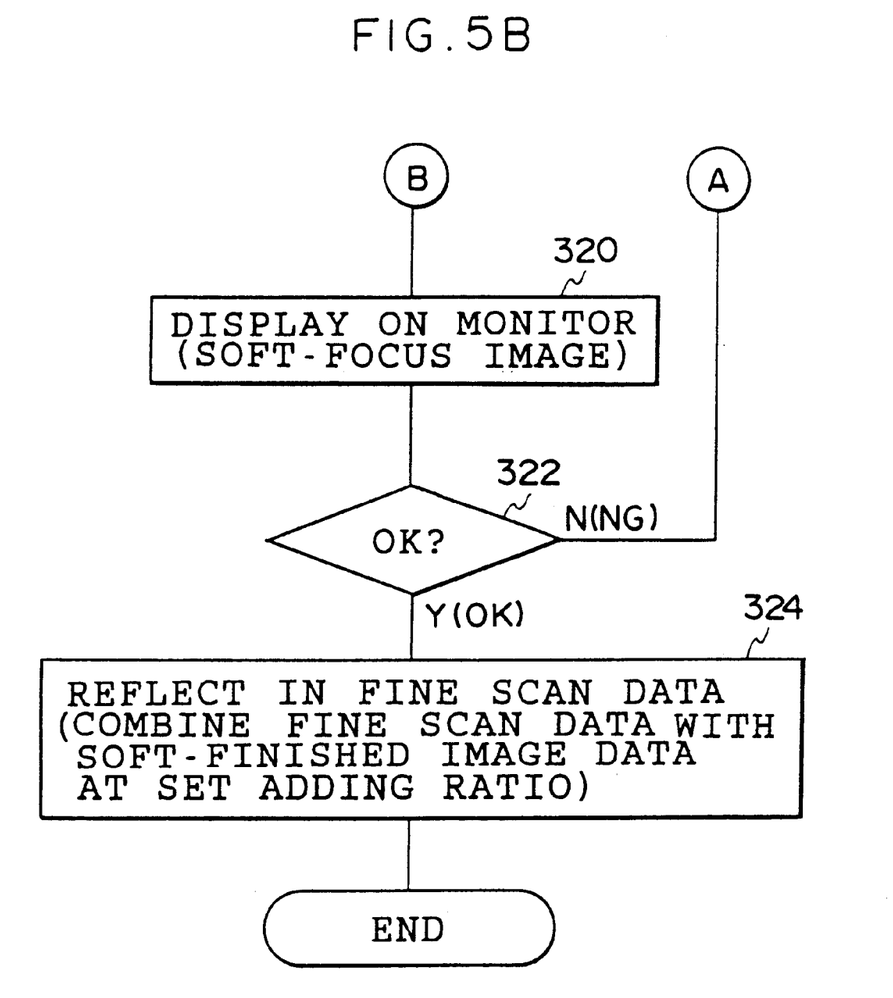

Operation of soft-focus intensity changing control according to the second embodiment will be hereinafter described with reference to flow chart shown in FIGS. 5A and 5B.

When fine scan is completed, fine scan data that has been stored in the fine scan memory 206 is first read in step 300. In the subsequent step 302, light amount correction by the peripheral light amount correcting portion 222, various adjustments such as color balance adjustment and contrast adjustment, and various corrections such as brightness correction and color saturation correction are effected to fine scan data and the process proceeds to step 304.

In step 304, the soft-finished image forming portion 232 generates soft-finished image data. Soft-finished image data is generated by passing the fine scan data, which has been subjected to various adjustments, corrections and the like, through an unillustrated filter so that the high-frequency components and medium-frequency components are eliminated from the components that constitute the fine scan data, thereby allowing the fine scan data to consist of the low-frequency components only. In other words, fine scan data consisting of the low-frequency components only corresponds to soft-finished image data.

Pre-scan data is read in the next step 306, which is followed by step 308 where an image based on the pre-scan data is displayed on the monitor 16M. By using what is displayed on the monitor 16M as pre-scan data, more rapid access speed can be attained than when fine scan data is used, thereby allowing rapid processing. Further, a required memory amount can be smaller.

In the next step 310, the face extracting frame is set in such a manner that it overlaps the image displayed on the monitor 16M. The size and aspect ratio of the face extracting frame can be changed with the operation of the keyboard 16K or the mouse.

In the next step 312, enlargement/reduction, and/or shifting of the frame is carried out with the operation of the keyboard 16K or the mouse, so that the face extracting frame is adjusted to the face of the person in the image. In the subsequent step 314, a determination is made as to whether the position of the frame is determined or not, in other words, whether the frame is adjusted to the face or not. If the answer to the determination is negative, the process returns to step 312, where enlargement/reduction, and/or a shifting of the frame are continued.

Further, in step 314, if the answer to the determination is affirmative, in other words, it is determined that the relative position of the face to the frame is determined, the process moves to step 316.

In the subsequent step 316, the adding ratio for the time when pre-scan data and soft-finished image data are combined with each other is set. The setting of the adding ratio is carried out by the adding ratio setting portion 236. In other words, the adding ratio is read on the basis of the LUT as "a face size to the adding ratio characteristics" for setting.

After the adding ratio has been set, in step 318, pre-scan data and soft-finished image data are combined with each other on the basis of the adding ratio that has been set, thereby generating combined image data. Then, the process moves to step 320.

In step 320, the combined image data (soft-focus image data) thus generated is displayed on the monitor 16M.

In the next step 322, the operator sees the displayed soft-focus image to make a determination as to whether it is adequate or. In a case when the answer to the determination is inadequate (NG), the process moves to step 312 where the process is restarted from the extraction of the face (enlargement/reduction, and/or a shifting of the frame). It should be noted that if the degree of inadequacy is low, it may be adjusted with the operation of the keyboard 16K or the mouse, using the number of stages that have been set in advance. For example, fine adjustment such as +adjustment and −adjustment may be carried out by operating a mouse in such a manner as to drag and slide a knob portion of an indicator with a pointer.

In a case when the answer to the determination in step 322 is adequate (OK), the process moves to step 324 where the adding ratio described above is reflected in fine scan data. Then, the processing is terminated.

As can be seen from the above description, since the adding ratio can be set while watching the generated soft-focus image with the use of the monitor 16M, an adequate soft-focus image can be obtained quickly.

Further, since the extraction of the face is carried out by the frame and the relation of the region of the face (the frame size) to the adding ratio is stored in advance as the LUT, this method has a higher precision than when the face is extracted automatically for the setting of the adding ratio.

It should be noted that in the present embodiment, mention is not particularly made of the type of soft-finished image data. However, soft-finished image data is generally produced for image data of each color, i.e., R, G, and B so that a combining operation is carried out for each color.

Soft-focus image (R)=R original image data+R soft-finished image

Soft-focus image (G)=G original image data+G soft-finished image

Soft-focus image (B)=B original image data+B soft-finished image

As a variation of the above method, a simplified method may be used in which a common Y signal is generated as a soft-finished image so that the Y signal thus generated is added to each color.

Soft-focus image (R)=R original image data+Y soft-finished image

Soft-focus image (G)=G original image data+Y soft-finished image

Soft-focus image (B)=B original image data+Y soft-finished image

In this case, the Y signal has been generated by combining the respective colors of R, G, and B at a predetermined ratio. For example, the ratio may be Y=0.3R+0.6G+0.1B. Further, the respective colors can be combined equally as in Y=0.33R+0.33G+0.33B.

Further, in the second embodiment described above, low resolution data is used for the image that is displayed on the monitor 16M. However, high resolution data that serves as the data for printing may be used as it is. Although the use of high resolution data puts a burden on a memory and the like, it will enable the image displayed on the monitor to represent faithfully an image to be printed, on the basis of which determination of appropriateness can be carried out.

Moreover, in the present embodiment, there has been further shown an example in which the soft-focus image based on the printing image data is recorded on the recording material in the laser printer section 18 for outputting. However, the image processing apparatus of the present invention is not limited to the above configuration. For example, a monitor may be connected to the image date converting portion 216 provided to the fine scan processing portion 218 so that the soft-focus image is displayed on the monitor for outputting.

What is claimed is:

1. An image processing apparatus, comprising:

soft-finished image data generating means for generating soft-finished image data representing a soft-finished image in which sharpness of an original image represented by said original image data is reduced, on the basis of original image data;

ratio setting means for setting a ratio representing the weight of soft-finished image data in relationship with said original image data for the time when said soft-finished image data that is generated by said soft-finished image data generating means and said original image data are combined with each other; and image data combining means for, on the basis of the ratio set by said ratio setting means, combining said soft-finished image data with said original image data so as to generate image data for output.

2. An image processing apparatus according to claim 1, further comprising soft-finish-degree changing means for changing a degree of soft-finish of said soft-finished image data generated by said soft-finished image data generating means.

3. An image processing apparatus according to claim 1, further comprising:

face region extracting means for, on the basis of said original image data, extracting a region which corresponds to a face of a person in said original image; and determining means for determining the size of the region which corresponds to the face and which is extracted by said face region extracting means, wherein, on the basis of the size of the region corresponding to the face which size is determined by said determining means, said ratio setting means sets the ratio for the time when said soft-finished image data and said original image data are combined with each other.

4. An image processing apparatus according to claim 2, further comprising:

face region extracting means for, on the basis of said original image data, extracting a region which corresponds to a face of a person in said original image; and determining means for determining the size of the region which corresponds to the face and which is extracted by said face region extracting means, wherein, on the basis of the size of the region corresponding to the face which size is determined by said determining means, said ratio setting means sets the ratio for the time when said soft-finished image data and said original image data are combined with each other.

5. An image processing apparatus according to claim 1, further comprising:

outputting means for outputting an image based on the image data for output that is generated by said image data combining means; and ratio inputting means for inputting correction instructing information that gives an instruction to correct the ratio set by said ratio setting means, wherein, when the correction instructing information that gives an instruction to correct the ratio is inputted via said ratio inputting means, said ratio setting means corrects the ratio in accordance with the inputted information.

6. An image processing apparatus according to claim 2, further comprising:

outputting means for outputting an image based on the image data for output that is generated by said image data combining means; and ratio inputting means for inputting correction instructing information that gives an instruction to correct the ratio set by said ratio setting means, wherein, when the correction instructing information that gives an instruction to correct the ratio is inputted via said ratio inputting means, said ratio setting means corrects the ratio in accordance with the inputted information.

7. An image processing apparatus according to claim 3, further comprising:

outputting means for outputting an image based on the image data for output that is generated by said image data combining means; and ratio inputting means for inputting correction instructing information that gives an instruction to correct the ratio set by said ratio setting means, wherein, when the correction instructing information that gives an instruction to correct the ratio is inputted via said ratio inputting means, said ratio setting means corrects the ratio in accordance with the inputted information.

8. An image processing apparatus according to claim 5, wherein said outputting means is a monitor for displaying the image based on said image data for output, and an image that has been corrected in accordance with the correction instructing information inputted by said ratio inputting means or information representing a changed degree of soft-finish that has been changed by said soft-finish-degree changing means is successively displayed on the monitor.

9. An image processing apparatus according to claim 6, wherein said outputting means is a monitor for displaying the image based on said image data for output, and an image that has been corrected in accordance with the correction instructing information inputted by said ratio inputting means or information representing a changed degree of soft-finish that has been changed by said soft-finish degree changing means is successively displayed on the monitor.

10. An image processing apparatus according to claim 8, wherein said ratio inputting means substantially specifies a size of a face of a person in the image displayed on said monitor so that a ratio or a degree of soft-finish of said soft-finished image data that is appropriate for the substantially specified face size is set.

11. An image processing apparatus according to claim 9, wherein said ratio inputting means substantially specifies a size of a face of a person in the image displayed on the monitor so that a ratio or a degree of soft-finish of said soft-finished image data that is appropriate for the substantially specified face size is set.

12. An image processing apparatus according to claim 8, wherein an image is displayed on said monitor on the basis of low resolution image data that is prepared from said image data for output, and at least one of the ratio and the degree of soft-finish of said soft-finished image data is reset in such a manner that a result of display of the image based on the low resolution data is equivalent to a degree of soft-focus of an image that is actually outputted.

13. An image processing apparatus according to claim 10, wherein an image is displayed on said monitor on the basis of low resolution image data that is prepared from said image data for output, and at least one of the ratio and the degree of soft-finish of said soft-finished image data is reset in such a manner that a result of display of the image based on the low resolution data is equivalent to a degree of soft-focus of an image that is actually outputted.

14. An image processing apparatus, comprising:

soft-finished image data generating means for generating soft-finished image data representing a soft-finished image in which sharpness of an original image represented by said original image data is reduced in accordance with a degree of soft-finish that is set in advance, on the basis of original image data;

soft-finish-degree setting means for setting, with respect to the original image, a degree of soft-finish of the soft-finished image represented by said soft-finished image data, which is generated by said soft-finished image data generating means; and image data combining means for combining said soft-finished image data that is generated by said soft-finished image data generating means with said original image data so as to generate image data for output.

15. An image processing apparatus according to claim 14, further comprising:

face region extracting means for, on the basis of said original image data, extracting a region which corresponds to a face of a person in said original image; and determining means for determining the size of the region which corresponds to the face and which is extracted by said face region extracting means, wherein, on the basis of the size of the region corresponding to the face which size is determined by said determining means, said soft-finish-degree setting means sets, with respect to the original image, the degree of soft-finish of the soft-finished image represented by said soft-finished image data.

16. An image processing apparatus according to claim 14, further comprising:

outputting means for outputting an image based on the image data for output that is generated by said image data combining means; and soft-finish-degree inputting means for inputting information that gives an instruction to correct the degree of soft-finish set by said soft-finish-degree setting means, wherein, when the information that gives the instruction to correct the degree of soft-finish is inputted via said soft-finish-degree inputting means, said soft-finish-degree setting means corrects the degree of soft-finish in accordance with the inputted information.

17. An image processing apparatus according to claim 15, further comprising:

outputting means for outputting an image based on the image data for output that is generated by said image data combining means; and soft-finish-degree inputting means for inputting information that gives an instruction to correct the degree of soft-finish set by said soft-finish-degree setting means, wherein, when the information that gives the instruction to correct the degree of soft-finish is inputted via said soft-finish-degree inputting means, said soft-finish-degree setting means corrects the degree of soft-finish in accordance with the inputted information.

18. An image processing apparatus according to claim 1, wherein said image data combining means forms soft-finished images of respective colors of R, G, and B of the original image, and carries out a combining operation on each of the respective soft-finished images of the respective colors of R, G, and B of the original image.

19. An image processing apparatus according to claim 14, wherein said image data combining means forms soft-finished images of respective colors of R, G, and B of the original image, and carries out a combining operation on each of the respective soft-finished images of the respective colors of R, G, and B of the original image.

20. An image processing apparatus according to claim 1, wherein said image data combining means forms a soft-finished image corresponding to a Y signal, and combines the soft-finished image corresponding to the Y signal with each of R, G, and B colors of the original image, respectively.

21. An image processing apparatus according to claim 14, wherein said image data combining means forms a soft-finished image corresponding to a Y signal, and combines the soft-finished image corresponding to the Y signal with each of R, G, and B colors of the original image, respectively.

22. An image processing apparatus, comprising:

an image data processor having a soft-finished image data generating portion, a ratio setting portion and an image data combining portion;

the soft-finished image data generating portion provided with a filter for generating soft-finished image data representing a soft-finished image in which sharpness of an original image represented by said original image data is reduced, on the basis of original image data;

the ratio setting portion provided with a calculating processor for setting a ratio representing the weight of soft-finished image data in relationship with the original image data for the time when the soft-finished image data that is generated by the soft-finished image data generating portion and the original image data are combined with each other; and the image data combining portion, connected to the ratio setting portion, for combining the soft-finished image data and original image data on the basis of the ratio set by the ratio setting portion so as to generate image data for output.

23. An image processing apparatus, comprising:

soft-finished image data generating processor for generating soft-finished image data representing a soft-finished image in which sharpness of an original image represented by the original image data is reduced in accordance with a degree of soft-finish that is set in advance, on the basis of original image data;

soft-finish-degree setting processor for setting, with respect to the original image, a degree of soft-finish of the soft-finished image represented by the soft-finished image data, which is generated by the soft-finished image data generating processor; and image data combining processor for combining said soft-finished image data that is generated by the soft-finished image data generating processor with the original image data so as to generate image data for output.

24. An image processing method, comprising:

generating soft-finished image data representing a soft-finished image in which sharpness of an original image represented by the original image data is reduced, on the basis of original image data;

setting a ratio representing the weight of soft-finished image data in relationship with the original image data for the time when the generated soft-finished image data and the original image data are combined with each other; and combining the soft-finished image data and original image data on the basis of the ratio set so as to generate image data for output.

25. An image processing method, comprising:

generating soft-finished image data representing a soft-finished image in which sharpness of an original image represented by the original image data is reduced in accordance with a degree of soft-finish that is set in advance, on the basis of original image data;

setting, with respect to the original image, a degree of soft-finish of the soft-finished image represented by the soft-finished image data; and combining said soft-finished image data with the original image data so as to generate image data for output.

* * * * *